Aug. 4, 1964 J. P. WOODS ETAL 3,143,658

METHOD AND APPARATUS FOR PRODUCING AND RECORDING
A PULSE FREQUENCY MODULATED SIGNAL

Filed Nov. 28, 1958 2 Sheets-Sheet 1

Attest
Charles F. Steininger

INVENTOR.
John P. Woods
Edwin B. Neitzel
BY Norbert E. Birch
Attorney

Attest
Charles F. Steininger

INVENTOR.
John P. Woods
Edwin B. Neitzel
BY Norbert E. Birch
Attorney 3,143,658

METHOD AND APPARATUS FOR PRODUCING AND RECORDING A PULSE FREQUENCY MODULATED SIGNAL

John P. Woods and Edwin B. Neitzel, Dallas, Tex., assignors to The Atlantic Refining Company, Philadelphia, Pa., a corporation of Pennsylvania Filed Nov. 28, 1958, Ser. No. 777,117
8 Claims. (Cl. 307—88.5)

The present invention relates to a method and apparatus for producing and recording a pulse frequency modulated signal. More particularly, it deals with a method and apparatus for increasing the linearity and calibration stability of a recording pen amplifier.

Heretofore, the linearity of recording pen amplifier circuits has been a function of the power amplifier. Because of this, calibration was very unstable; and with changes of characteristics in the power stage, the calibration would change. This would result in an inaccurate presentation of the information transcribed by the recording pen. With the advent of magnetic recording, automatic computers, plotters, and recorders in various data handling fields, and particularly in the seismic and well logging fields, recording and transcribing apparati have assumed critical importance. For example, after a seismogram is recorded on magnetic tape or by earlier conventional means, it is highly desirable to analyze and study these records with various electronic devices, such as the above-mentioned computers, plotters, etc. In this type of study it is necessary to transfer the recorded information from the original record to another type record for visual inspection. See copending applications, Serial No. 749,190 and Serial No. 761,044, owned by a common assignee. When the original record is transcribed for visual inspection and for correlation with other records, for the purpose of constructing synthetic seismograms, for individual record study, or any other geophysical purpose, it is mandatory that the record be transferred in an accurate manner since the information under study is carried in the various wave shapes and frequencies. Therefore, if in the transfer process waves are distorted, frequencies disturbed, or the transcription is made inaccurate in any way, the vital information therein is disturbed and distorted so that the prolonged and expensive process of seismic or well logging study loses some or all of its value.

With the introduction of the "Massa" type pen recorder (manufactured by Massa Laboratories), which utilizes a rectilinear linkage, additional recording problems, including added frictional effects, presented themselves.

Various type circuits have been designed in an attempt to improve circuit linearity and stabilize calibration. In an attempt to temperature stabilize the power transistors utilized in a conventional pen amplifier circuit, thermistors are commonly used in the base circuit of the Class B push-pull output stage. However, the over-all circuit stability and linearity are still limited by the temperature effects on the power transistor stage and the associated lower power driver transistor stage. A recently developed complementary, symmetry circuit does away with the transformer coupling found in the conventional pen amplifier circuit. This circuit utilizes a PNP and a NPN transistor. This appears to be the most advanced type circuit used to date with the feature of fair linearity and calibration under operating conditions. Although this circuit has met with some success, it requires an expensive NPN silicon transistor for handling the high power needed for a "Massa" type pen. In addition to this disadvantage, the circuit is not capable of overcoming the increased frictional effects of the rectilinear linkage found in most new recording pens. As a result of the additional frictional effect, many times original records are not transcribed or rerecorded with the required degree of fidelity for accurate study, comparison, correlation, etc.

It is an object of this invention to provide a novel method and apparatus for producing and recording a pulse frequency modulated signal.

Another object of this invention is to provide a method and means for increasing the linearity and calibration stability of a recording pen amplifier.

An additional object of this invention is to provide an improved recording pen motor drive amplifier apparatus and method of operation in which the linearity is a function of the linearity of an F.M. modulator.

Another object of the invention is to provide an improved recording pen motor drive amplifier apparatus and method of operation in which the calibration is set primarily by the D.C. voltage of the power supply and in which the changing characteristics of the power stage transistors or tubes do not change the calibration of the apparatus.

Another object of this invention is to provide an improved pen motor drive amplifier apparatus and method of operation capable of overcoming the increased frictional effect of the "Massa" type pen as well as the frictional effects in the conventional pen.

Another object of this invention is to provide an improved recording pen motor drive amplifier apparatus and method of operation which exhibits a much higher degree of efficiency than a conventional circuit utilizing a Class B amplifier.

Another object of this invention is to provide an improved pen motor drive amplifier apparatus and method of operation requiring a smaller, lower power transistor to develop the same power output as a conventional amplifier.

Another object of this invention is to provide an improved pen motor drive amplifier apparatus and method of operation that results in maximum dynamic range, reduced power requirements, and a greatly simplified circuit.

Briefly described, the invention comprises a method and apparatus for producing and recording a pulse frequency modulated signal. Applicants' novel method of operation greatly increases a recording pen amplifier's linearity and calibration stability. The method comprises detecting or receiving a signal, amplifying and equalizing the signal, frequency modulating a carrier with the equalized signal, changing the modulation of the carrier to pulse frequency modulation, operating an on-off transistor switch with the modulated pulse, and utilizing a recording pen, oscilloscope, or other means to integrate the switch output.

Figure 1:
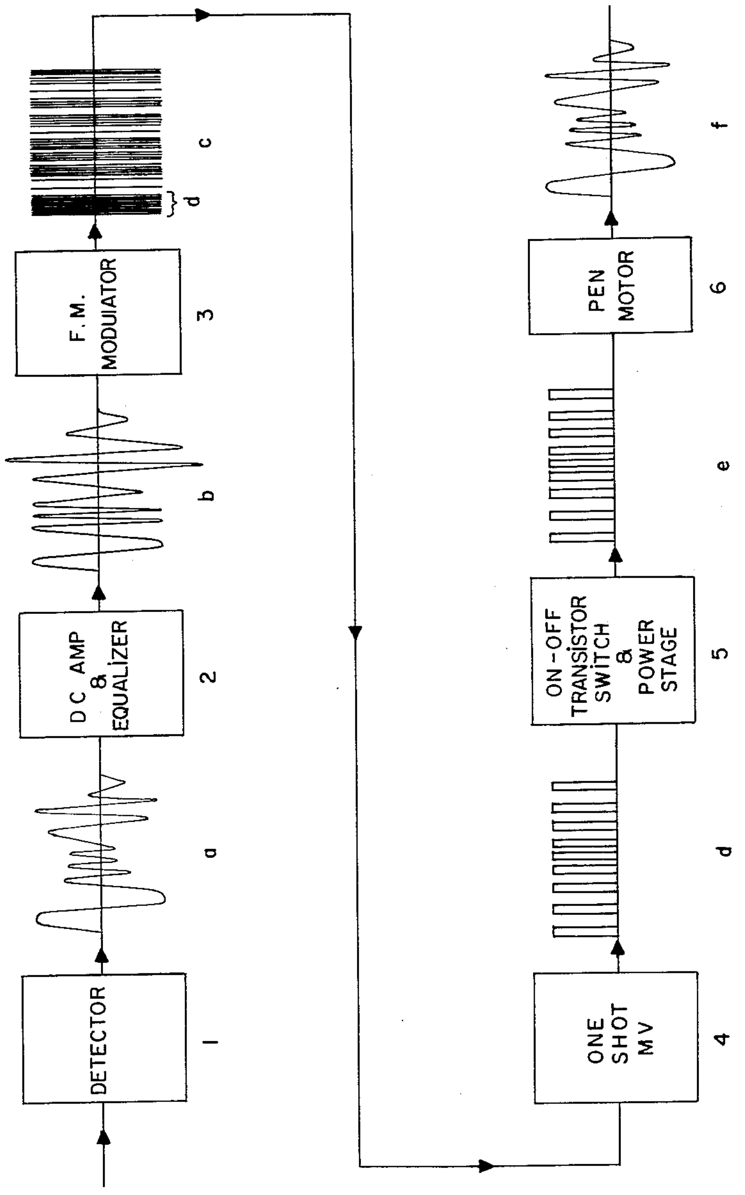
FIGURE 1 illustrates in block form one apparatus for practicing applicants' novel method of operation.

Referring more specifically to FIGURE 1, this figure shows a block diagram of various elements that can be used to practice applicants' novel method of operation. Included with the block diagram are the various type waveforms produced by the respective elements. Detector 1 receives the signal from magnetic tape or from the desired source and converts the signal to an audio type or amplitude varying signal *a*. D.C. amplifier 2 receives the signal and amplifies it. Depending on the type of recording pen motor or integrator used, the D.C. amplifier may or may not be equipped with an equalizer circuit. Usually an equalizer circuit is required to compensate for the frequency response characteristics of the pen motor or integrator. If an equalizer circuit is used, it applies more signal to the higher frequencies, changing waveform *a* to waveform *b*. The output voltage of amplifier 2 is used as a bias to determine the output frequency of the F.M. modulator 3. The F.M. modulator, which exhibits excellent linearity, produces a frequency modulated carrier *c*, which is sent to the one-shot multivibrator 4. It should be noted at this point that various carrier frequencies can be utilized and that by using a certain carrier frequency, a particular advantage will be derived therefrom, as will be discussed hereinafter. The one-shot multivibrator 4 receives the frequency modulated carrier wave *c* and changes the signal to a pulse frequency modulated signal *d*. Signals *d* and *e* are the portion of signal *c* in bracket *d*. The pulse frequency modulated signal operates a switching tube or transistor 5. Since the efficiency of an electronic switch can approach 100 percent while the efficiency of a Class B type amplifier usually approaches 75 percent, the transistor utilized in applicants' novel method of operation is a smaller, lower power transistor than the power transistor used in conventional pen amplifier circuits. The pulse frequency modulated pulses from switch 5 are integrated by pen motor 6 and presented as an amplitude-varying signal. It should be noted that pen motor 6 may be a conventional type integrator if the circuit is to be utilized to drive an oscillograph or other type reproducing means.

Applicants' novel method of operation increases the pen amplifier linearity and calibrating stability by making the circuit linearity a function of the F.M. modulator instead of the power amplifier. In addition to these advantages, numerous other advantages accrue, such as:

(1) In comparison with the conventional method of operation applicants' method is better adapted to field use because of its lower power requirements. As pointed out above, applicants' power transistor is a smaller, lower power transistor than is required in conventional Class B amplification. Since the efficiency of applicants' switching circuit approaches 100 percent, the over-all circuit efficiency is higher than the conventional type and thus requires less power to operate. This is a definite advantage, especially when the apparatus is operating on a battery supply.

(2) In comparison with the conventional method of operation, applicants' method of operation is better suited to overcoming the increased frictional effects of the "Massa" type pen since applicants' method utilizes a carrier frequency. Lodgment of dirt or other foreign material in a conventional recording pen and particularly type recording pen is a problem common in the recording art. Since applicants' recorder operates around a carrier frequency, the pen is freed from foreign material when the pen is turned on and before intelligence is transcribed. In a conventional recorder the pen does not vibrate until intelligence is recorded, and thus the fidelity of the recording is influenced by the foreign matter.

(3) In comparison with the conventional method of operation, applicants' method is better suited for operating as a simplified circuit. As an example, if applicants' carrier frequency is operated at the normal F.M. range of 500 to 4,500 c.p.s. (center carrier of 2,500 c.p.s.), the recording circuit can be greatly simplified. Detector 1, D.C. amplifier 2, and F.M. modulator 3 can be eliminated; and the F.M. recording can be amplified and sent directly to the one-shot multivibrator 4. Thus, the pen amplifying and recording circuit consists only of an amplifier (not shown), one-shot multivibrator 4, switch 5 and integrator or pen motor 6. This simplification of the circuit results in maximum dynamic range because the signal is left in the F.M. form. In addition, the reduction of operating elements again reduces the power requirement and, thus, makes applicants' invention even better suited for use as field equipment.

Figure 2:
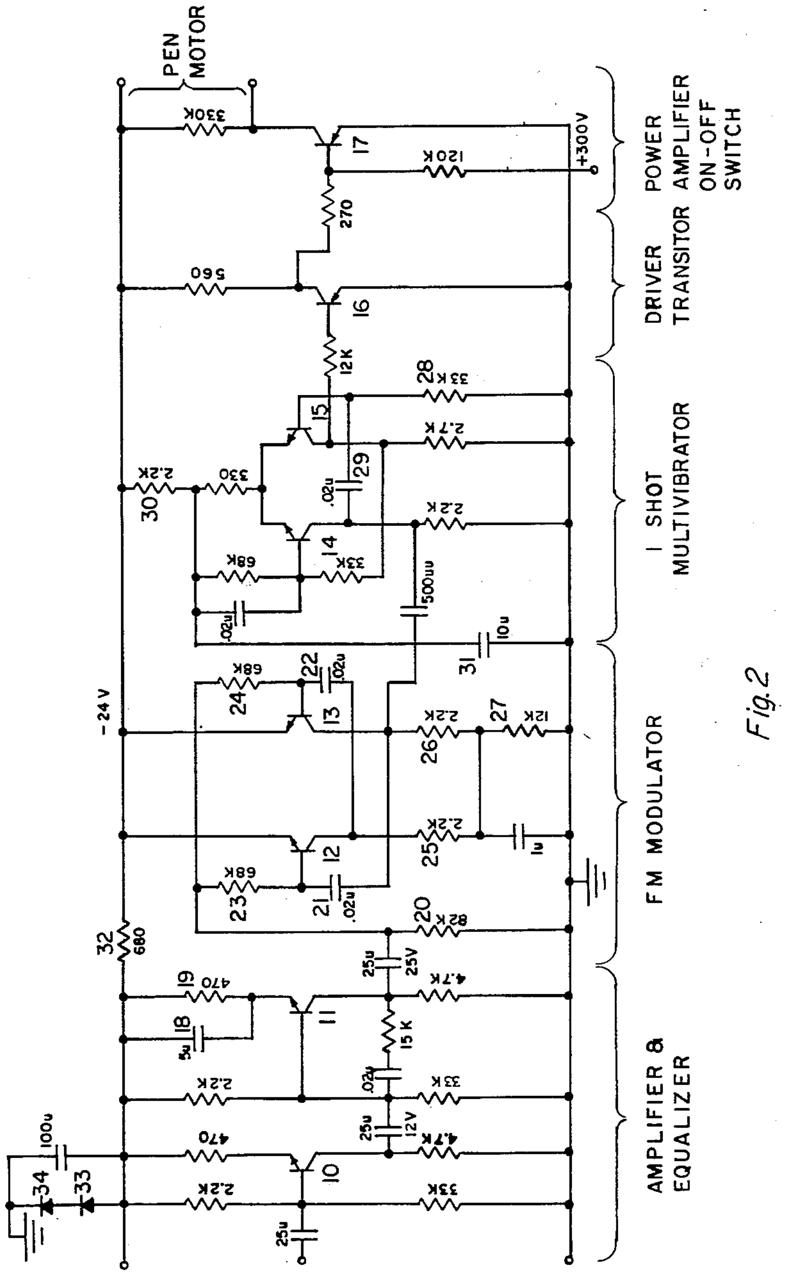
FIGURE 2 is a circuit diagram of a transistorized apparatus capable of performing applicants' method of operation.

Referring now to FIGURE 2, showing one form of a transistorized circuit capable of performing applicants' novel method of operation. The amplifier equalizer circuit includes transistors 10 and 11, the F.M. modulator includes transistors 12 and 13, the one-shot multivibrator includes transistors 14 and 15, the driver includes transistor 16, and the power amplifier on-off switch includes transistor 17.

In operation the low impedance output from an impedance matching stage, not shown, drives the amplifier and equalizer stage. This stage performs the functions of amplifying the audio signal and equalizing for the frequency characteristic of the pen motor. The equalization is accomplished by setting a capacitor bypass 18 across the emitter resistor 19 of the second amplifier stage. This capacity value allows the emitter of transistor 11 to be properly bypassed at the high frequencies so that the gain of the second amplifying stage is much higher as frequency increases. The output of the amplifier equalizer stage drives the F.M. modulator. With zero signal out, the F.M. modulator oscillates at the center carrier frequency. This frequency is set by the amount of base current flowing into the base of the two multivibrator transistors 12 and 13. An 82K ohm resistor 20 is used to set the proper frequency. Since transistor characteristics vary over a large range, this value will be different for almost any pair of transistors. The resistor 20 and 68K ohm resistors 23 and 24 are relatively high values so that the modulator input audio voltage will be converted to essentially a constant load impedance. This input impedance will be independent of the modulator frequency. The high impedance is necessary to obtain high linearity from the F.M. modulator. The frequency of the multivibrator is also set by the crossover .02 microfarad capacitors. The 12K ohm resistor 27 is to decrease the effective collector voltage for the two transistors. The output of the F.M. modulator drives the one-shot multivibrator. Each time a pulse is received by the one-shot multivibrator, the output voltage becomes more positive to cause the driver transistor 16 to cut off. The duration of the current pulse which is applied is set by the time constant of the one-shot multivibrator. The 33K ohm resistor 28 and the .02 microfarad capacitor 29 set the time duration of the current pulse. The 2.2K ohm resistor 30 decreases the effective working voltage for the multivibrator. Since the 2.2K ohm resistor is used to decrease the effective voltage, it is bypassed by a 10 microfarad capacitor 31, which is a decoupling capacitor. The output of the one-shot multivibrator drives the driver transistor 16 and also acts as an isolation transistor between the one-shot multivibrator and the power transistor switch. In actual practice the power transistor switch 17 conducts high current into a pen motor. Large currents flow across the common impedance of the minus 24-volt supply, and this voltage could feed back into the input of the transistor amplifier 10 and 11 to cause oscillation if the input high gain stages were not decoupled. The decoupling is effected by the 680 ohm resistor 32 in the minus 24-volt line and the Zener diodes 33 and 34. Capacitors could be used in place of the Zener diodes if effective decoupling could be obtained for the frequencies considered. However, for a very low frequency amplifier it is difficult to decouple for the extremely low frequencies. Therefore, the Zener diodes have been used in addition to the conventional decoupling capacitor.

From the foregoing, it will be observed that applicants have provided a novel method and means for producing and recording a pulse frequency modulated signal that enables the pen amplifier linearity to be a function of the F.M. modulator instead of the power amplifier. It is also clear from the above that since the F.M. modulator can be made to exhibit a high degree of linearity, the pen amplifier will likewise exhibit a high degree of linearity and calibration stability.

While particular modifications have been illustrated and described, it will be apparent that further modifications will suggest themselves to those skilled in the art;

and it is intended to cover such modifications as fall within the scope of the appended claims.

We claim:

1. An improved amplifying and driving circuit for an electromechanical integrator comprising an amplifier, a one shot multivibrator, a frequency modulator connected to said amplifier and to said multivibrator, and an on-off switching means connected to said multivibrator.

2. In a device as set forth in claim 1 wherein the on-off switch means includes a transistor.

3. An improved amplifying and driving circuit for an electromechanical integrator comprising a first means for converting a predetermined type of signal to a frequency modulated signal, a second means for converting said frequency modulated signal into a pulse frequency modulated signal, and a third means for amplifying said pulse frequency modulated signal to a preselected voltage level, said second means connected between and to said first and said third means.

4. In a circuit as set forth in claim 3 wherein the second means includes a one shot multivibrator.

5. In a circuit as set forth in claim 4 wherein the third means includes a power transistor adapted to operate as an on-off switch.

6. An improved amplifying and driving circuit for an electromechanical integrator comprising an amplifier stage including first and second transistors, each of said first and second transistors having a base, a collector and an emitter, and a first resistor connected to said second transistor emitter, said first transistor collector coupled to said second transistor base; a frequency modulator including a second resistor of predetermined value adapted to cause said modulator to oscillate at a preselected center frequency, third and fourth transistors, each of said third and fourth transistors having a base, a collector and an emitter, said third transistor base coupled to said second transistor collector, and said second resistor coupled in parallel to said third transistor base, and said fourth transistor base; a one shot multivibrator including fifth and sixth transistors, each of said fifth and sixth transistors having a base, a collector and an emitter, said fifth transistor collector coupled in parallel to said fourth transistor collector and said third transistor base; a driver transistor including a base, a collector and an emitter, said driver transistor base coupled in parallel to said sixth transistor collector and said fifth transistor base; a medium power transistor including a base, a collector and an emitter, said power transistor base coupled to said driver transistor collector; and a decoupling circuit adapted to decouple very low frequencies including a third resistor and at least one Zener diode connected in series to said power transistor collector.

7. In a circuit as set forth in claim 6 wherein the amplifier stage includes an equalizing circuit adapted to equalize predetermined frequency characteristics of the integrator, said equalizing circuit including a capacitor of a predetermined value connected to the second transistor emitter and in parallel with the second resistor, and a frequency selective feedback circuit connected between the collector and the base of said second transistor.

8. In a circuit as set forth in claim 6 wherein the frequency modulator includes a large value resistor connected to the base of the third transistor and a large value resistor connected to the base of the fourth transistor, said resistors adapted to increase the linearity of said modulator.

References Cited in the file of this patent

UNITED STATES PATENTS

| | | |
|---|---|---|
| 2,338,512 | Harmon | Jan. 4, 1944 |
| 2,438,950 | Smith | Apr. 6, 1948 |
| 2,718,449 | Piety et al. | Sept. 20, 1955 |
| 2,822,131 | Aigrain | Feb. 4, 1958 |

UNITED STATES PATENT OFFICE
CERTIFICATE OF CORRECTION

Patent No. 3,143,658 August 4, 1964

John P. Woods et al.

It is hereby certified that error appears in the above numbered patent requiring correction and that the said Letters Patent should read as corrected below.

Column 3, line 48, before "type" insert -- in the rectilinear --.

Signed and sealed this 24th day of November 1964.

(SEAL)
Attest:

ERNEST W. SWIDER
Attesting Officer

EDWARD J. BRENNER
Commissioner of Patents